United States Patent [19]

Brüderle et al.

[11] Patent Number: 4,504,912
[45] Date of Patent: Mar. 12, 1985

[54] SATELLITES AND ROLL/YAW CONTROLS THEREFOR

[75] Inventors: Ernst Brüderle, Ottobrunn; Albrecht Reindler, Riemerling, both of Fed. Rep. of Germany

[73] Assignee: Messerschmitt-Bölkow-Blohm Gesellschaft mit beschränkter Haftung, Munich, Fed. Rep. of Germany

[21] Appl. No.: 397,066

[22] Filed: Jul. 12, 1982

[30] Foreign Application Priority Data

Jul. 16, 1981 [DE] Fed. Rep. of Germany ....... 3128054

[51] Int. Cl.$^3$ ............................................. B64G 1/10
[52] U.S. Cl. ................................... 364/434; 364/459; 244/166
[58] Field of Search ............... 364/434, 459; 244/3.21, 244/3.22, 164–173; 318/582, 585, 586; 73/178 R

[56] References Cited

U.S. PATENT DOCUMENTS

| | | | |
|---|---|---|---|
| 3,834,653 | 9/1974 | Perkel | 364/459 |
| 3,866,025 | 2/1975 | Cavanagh | 364/459 |
| 3,937,423 | 2/1976 | Johansen | 244/169 |
| 3,998,409 | 12/1976 | Pistiner | 364/434 |
| 3,999,729 | 12/1976 | Muhlfelder et al. | 364/434 |
| 4,062,509 | 12/1977 | Muhlfelder et al. | 364/434 |
| 4,071,211 | 1/1978 | Muhlfelder et al. | 244/165 |
| 4,084,773 | 4/1978 | Schmidt, Jr. et al. | 364/434 |
| 4,114,841 | 9/1978 | Muhlfelder et al. | 364/459 |

Primary Examiner—Gary Chin
Attorney, Agent, or Firm—Toren, McGeady and Stanger

[57] ABSTRACT

In the disclosed satellite and arrangement therefor, roll or yaw of a satellite with pitch momentum bias and travelling on a substantially polar orbit with the aid of a coil interacting with the earth's magnetic surface includes a timing arrangement for dividing the orbit of the satellite into four successive quadrants P1, P2, P3, and P4, with the quadrants being inclined at an angle of 45° to the equator and the quadrants P2 and P4 being polar quadrants and the quadrants P1 and P3 being equatorial quadrants. A first control unit produces satellite control signals in response to the timing means which are arranged to use the first control while the satellite is in the polar quadrants and the second control unit when the satellite is in the equatorial quadrants. The sign of the control unit is inverted in the quadrants P3 and P4, but maintained in the quadrants P1 and P2. Both controls use or generate internal signals corresponding to the roll angles and roll velocity to produce the control unit signals. However, the second control unit effects another signal equivalent to using or generating a roll acceleration signal.

4 Claims, 6 Drawing Figures

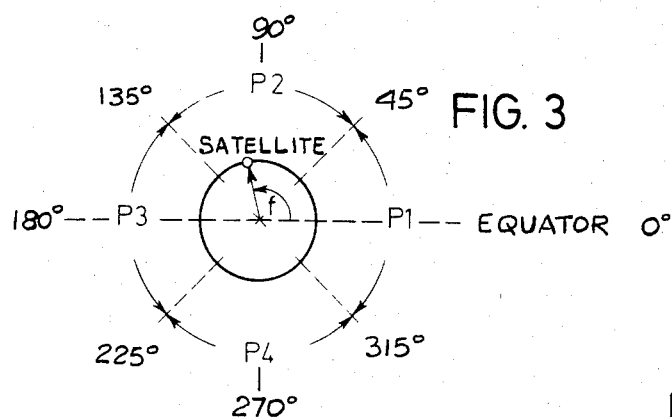
FIG. 3
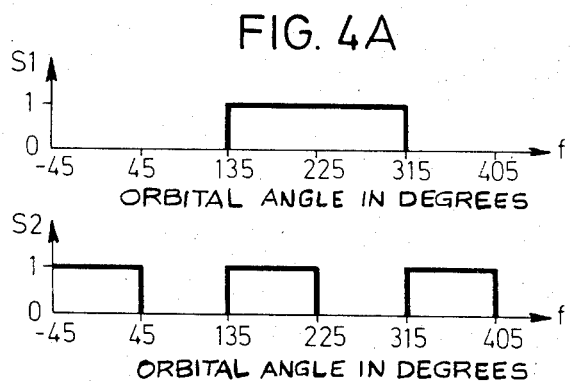
FIG. 4A
FIG. 4B
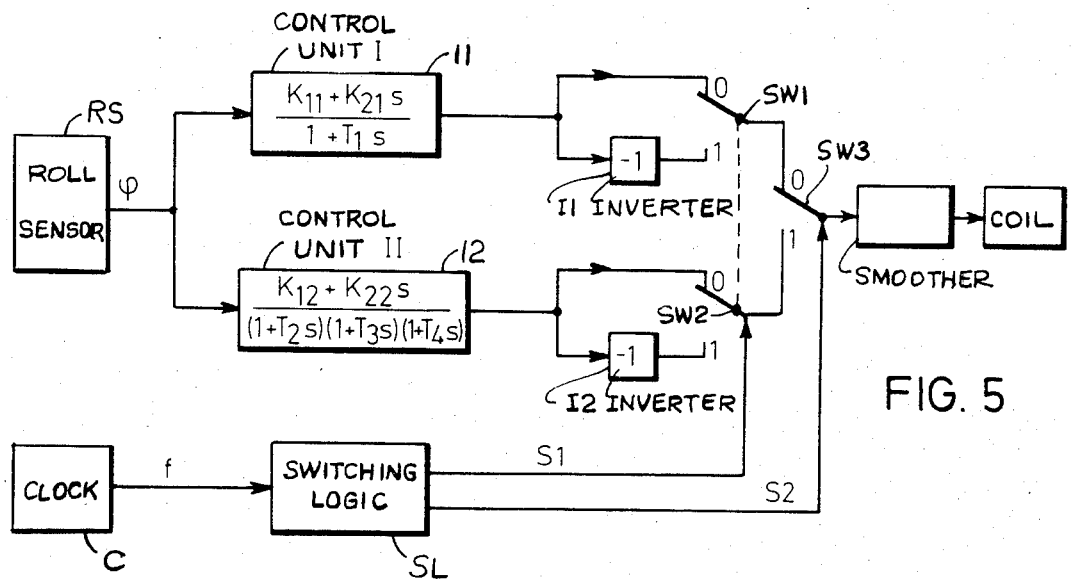
FIG. 5

SATELLITES AND ROLL/YAW CONTROLS THEREFOR

BACKGROUND OF THE INVENTION

This invention relates to satellites and roll/yaw controls therefor, and particularly to a roll/yaw control of a satellite equipped with pitch momentum bias and moving in a polar or near-polar orbit with the aid of a magnet coil interacting with the earth's magnetic field.

Known attitude control systems, such as described by K. T. Alfriend and R. E. Lindberg in Geomagnetic Field Effects on the Design of a Magnetic Attitude Control System, Nordwjk, October 1977, control the roll/yaw attitude by using an earth sensor for roll angle measurement, using a magnetometer for measuring the pitch and roll components of the earth's magnetic field, and by using a magnet coil, in the pitch axis, as a correcting element. In the latter system, the velocity of variation of the pitch component of the geomagnetic field is used to control the nutational motion, while the roll component of the geomagnetic field is used to change the direction of the spin vector. A disadvantage of such systems resides in the fact that they require magnetometers and a filter for suppressing the earth's rotational frequency in the magnetometer signal. Moreover, special precautions must be taken to avoid influencing the magnetometers with the field of the magnet coils.

An object of the invention is to improve satellites and roll/yaw controls therefor.

Another object of the invention is to avoid the aforementioned disadvantages.

Yet another object of the invention is to provide a control system which is free of these disadvantages, but without magnetometers.

SUMMARY OF THE INVENTION

According to an aspect of this invention, these objects are attained, in whole or in part, by (a) dividing the orbit of the satellite into four quadrants P1, P2, P3, and P4, with the quadrants being inclined at angles of 45° to the equator;

(b) providing two control units, namely Control I and Control II for control of the satellite, Control I being used in polar quadrants P2 and P4 and Control II in the equator quadrants P1 and P3;

(c) inverting the sign of the control signals from the control's units in the quadrants P3 and P4 from that sign used in the quadrants P1 and P2;

(d) forming control signals with the Control I using roll angles and roll velocity (or signals proportional thereto); and (e) having Control II use roll angles, roll velocity, and roll acceleration (or signals proportional thereto) for the formation of the control signal.

Because of these features, the attitude control of a satellite based on simple control laws becomes less complicated and more reliable. Moreover, they produce a positive effect in the weight and energy balance of the satellite, because fewer parts are needed, and accordingly less energy is consumed.

These and other features of the invention are pointed out in the claims forming a part of this specification. Other objects and advantages of the invention will become evident from the following detailed description when read in light of the accompanying drawings.

BRIEF DESCRIPTION OF THE DRAWINGS

In the drawings:

FIG. 3 is a diagram showing the orbit of a satellite divided into quadrants;

FIGS. 4A and 4B are graphs illustrating the switching signals S1 and S2 of FIGS. 1 and 2; and FIG. 5 is a block diagram of yet another arrangement embodying features of the invention.

DETAILED DESCRIPTION OF PREFERRED EMBODIMENTS

Figure 1:
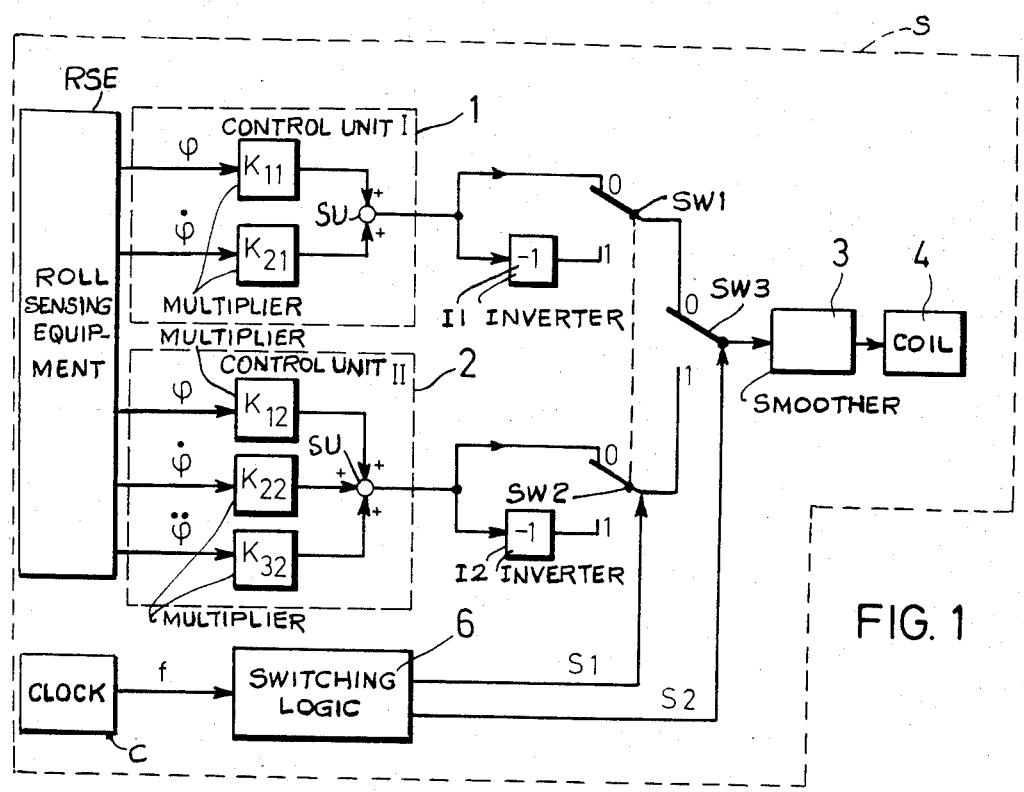
FIG. 1 is a block diagram of a satellite with roll/yaw control for a satellite using roll acceleration.

In FIG. 1, a first control unit 1 utilizes roll angles $\phi$ and roll velocities $\dot{\phi}$ for the formation of a control signal at the output thereof. A second control unit 2 utilizes the aforementioned roll angle $\phi$ and roll velocity $\dot{\phi}$ as well as the roll acceleration $\ddot{\phi}$ for formation of the control signal at the output thereof.

The signs of both control unit outputs are inverted by the signal S1. A signal S2 switches in one or the other of the two control units. The output signal of the respective added control units is sent to a smoothing stage 3, from which a magnet coil 4 receives its corresponding operating signal.

Figure 2:
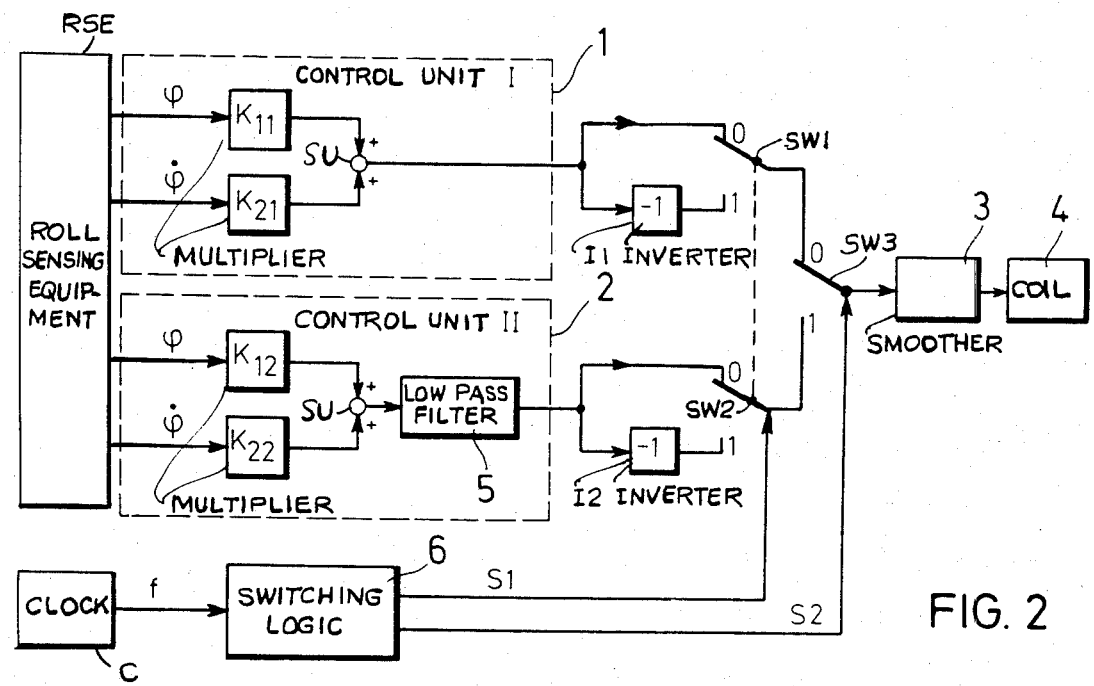
FIG. 2 is a block diagram of an arrangement for roll/yaw control of a satellite without using roll acceleration.

If the use in control unit 2 of a signal proportional to the roll acceleration is dispensed with, the signal obtained with the aid of $\phi$ and $\dot{\phi}$ is supplied to an additional low-pass filter 5, as shown in FIG. 2.

The switching between the control units 1 and 2 and the inversion of the signs of the control unit signals are determined by the position of the satellite on its orbit. To this end, the signal f corresponding to the satellite position, which signal can be taken from the clock present on board, in the usual manner, is supplied to a switching logic 6, which generates the signals S1 and S2 shown in FIG. 4.

The following linkage table indicates the relationship between the division of the orbit plane into quadrants as illustrated in FIG. 3 and the switch signals.

| Satellite in Quadrant | S1 | S2 |
| --- | --- | --- |
| P1 | 0 | 1 |
| P2 | 0 | 0 |
| P3 | 1 | 1 |
| P4 | 1 | 0 |

0: switch off
1: switch on

Accordingly, control unit 1, is switched in the quadrants P2 and P4 and control unit 2 is switched in quadrants P1 and P3. The control signal is inverted in the quadrants P3, P4.

An especially simple embodiment of the invention uses only the measured roll angle as an input quantity for the two control units and generates the signals proportional to the roll velocity by differentiation of the roll angle signal in the control unit, and dispenses with the need to consider the roll acceleration. In this instance, the control unit 1 is designed as a $PDT_1$ phase minimum system, and control unit 2 as a $PDT_3$ non-phase minimum system. FIG. 5 shows the block circuit diagram of this arrangement.

Specifically, in FIG. 1, roll sensing equipment RSE sense the instantaneous roll angle in the satellite S and produces an instantaneous roll signal $\phi$ equal or proportional to the roll angle. The roll sensing equipment further senses the roll velocity and the roll acceleration to produce the roll velocity signal $\dot\phi$ and the roll acceleration signal $\ddot\phi$. According to one embodiment of the invention, the roll sensing equipment is composed of three separate sensors, one to sense the roll angle, one to sense the roll velocity, and the third to sense the roll acceleration. According to another embodiment of the invention, the sensing equipment includes a sensor to sense the roll angle, and produce a roll angle signal $\phi$ proportional or equal to the roll angle, a differentiator which differentiates the value $\phi$ to produce a roll velocity signal $\dot\phi$, and a second differentiator to differentiate the signal $\dot\phi$ and thereby produce an acceleration signal $\ddot\phi$ representative of the roll acceleration.

In the first control unit 1, a multiplier $K_{11}$ multiplies the roll angle signal $\phi$ by a constant value $K_{11}$, while a constant multiplier $K_{21}$ multiplies the roll velocity signal $\dot\phi$ by a constant value $K_{21}$. A summing circuit SU adds the output of the multipliers $K_{11}$ and $K_{21}$ to produce the output of the first control unit 1.

In the control unit 2, a multiplier $K_{12}$ multiplies the signal $\phi$ representing the instantaneous roll angles by a value $K_{12}$, a constant multiplier $K_{22}$ multiplies the roll velocity signal $\dot\phi$ by a constant value $K_{22}$, while a constant multiplier $K_{32}$ multiplies the roll acceleration signal $\ddot\phi$ by a value $K_{32}$. A summing circuit SU2 sums the values at the outputs of the multipliers $K_{12}$, $K_{22}$, and $K_{32}$ to produce the output of the control unit 2.

Inverters I1 and I2 invert the respective values at the outputs of control unit 1 and control unit 2. Switching logic 6 responds to a signal f from a satellite clock C. On the basis of the position of the satellite relative to its orbit, as determined by the signal f, the logic circuit 6 produces a signal S1 which switches selector switches SW1 and SW2 between positions 0 and 1 in which they select either the output of the control units or the inverters I1 and I2. The switching logic 6 further produces a signal S2 which controls a switch SW3 to switch between the signals from the first control unit 1 and the second control unit 2.

In order to generate appropriate control torques some signs of the components of the geomagnetic field have to be taken into account. Because of the near polar orbit of the satellite these signs are known for each quadrant P1,P2,P3 and P4 without measurement. They are introduced by switching the polarity of the output of the control units according to signal S1 and by selecting signals from control unit 1 and control unit 2 according to signal S2.

The smoothing circuit 3 applies the resulting signals through the switch SW3 to magnet coil 4. The magnetic moment of the satellite produced by the coil 4 interacts with the geomagnetic field to provide the required control torque without additional means.

The switching times of the signals S1 and S2 are shown in FIGS. 4A and 4B with respect to angular positions as shown in the diagram of the sattelite orbit of FIG. 3.

FIG. 2 illustrates a circuit arrangement corresponding to the circuit arrangement RSE to 4 in FIG. 1 but differs therefrom in that the second control 2', contains no multiplier $K_{32}$ that responds to an acceleration signal $\ddot\phi$. Rather, the effect is obtained by passing the output of the summing circuit SU2 through the low-pass filter 5.

In FIG. 5, the arrangement is simplified in that the roll sensor RS is substituted for the roll sensing equipment RS. Here, only the roll sensor RS is used to produce a roll angle signal $\phi$ corresponding to the instantaneous roll angle. This is applied to the first control unit 11 which acts upon the signal $\phi$ to produce the same results as produced by the control unit 1. This is done mathematically as indicated by the Laplace transforms where s is the Laplace transform operator.

While embodiments of the invention have been described in detail, it will be evident that the invention may be practiced otherwise without departing from its spirit and scope.

What is claimed is:

1. An arrangement for roll/yaw control of a satellite with pitch momentum bias and arranged for movement on a near polar orbit with the aid of a magnet coil entering into interaction with the earth's magnetic field, characterized in:
    (a) timing means for dividing the time of the orbit of satellite and producing timing pulses at times representing four successive quadrants P1, P2, P3, and P4, the quadrants being inclined at an angle of 45° to the equator and the quadrants P2 and P4 being polar quadrants and the quadrants P1 and P3 being equator quadrants;
    (b) a first control units for producing satellite control signals when the satellite is in the polar quadrants P2 and P4 and a second control unit for producing satellite control signals when the satellite is in the equator quadrants P1 and P3;
    (c) inverting means responsive to the timing means for inverting the sign of the satellite control signals when the timing pulses represent quadrants P3 and P4 and for maintaining the satellite control signals when the timing pulses represent the quadrants P1 and P2;
    (d) said first control unit being arranged to respond to signals representing roll angles and roll velocity for the formation of the satellite control signal;
    (e) said second control unit being arranged to respond to signals representing roll angles and roll velocity and having acceleration signal means for producing roll acceleration signals for the formation of the satellite control signal;
    (f) switching means for switching between the said control units; and
    (g) transfer means responsive to the inverted and maintained satellite control signals for applying the signals to the coil for controlling the roll/yaw of said satellite.

2. An arrangement according to claim 1, wherein the second control unit is arranged to respond only to roll angles and roll velocity signals for the formation of an intermediate satellite control signal and includes a low-pass filter for filtering the sum of the roll angles and roll velocity signals.

3. An arrangement as in claim 1, wherein said acceleration signal means in said second control unit responds to signals representing roll acceleration.

4. An arrangement as in claim 1, further comprising sensing means coupled to said first control unit and said second control unit for generating signals representing roll angles and roll velocity.

* * * * *